Oct. 9, 1962 N. E. PETERSON 3,057,958

TELEGRAPH TEST SET

Filed Aug. 24, 1959 3 Sheets-Sheet 1

INVENTOR.
NORMAN E. PETERSON
BY Norman E. Peterson

Oct. 9, 1962 N. E. PETERSON 3,057,958

TELEGRAPH TEST SET

Filed Aug. 24, 1959 3 Sheets-Sheet 2

*INVENTOR.*

NORMAN E. PETERSON

*BY* Norman E. Peterson

INVENTOR.
NORMAN E. PETERSON
BY Norman E. Peterson

United States Patent Office 3,057,958

Patented Oct. 9, 1962

3,057,958

TELEGRAPH TEST SET

Norman E. Peterson, Norwalk, Conn., assignor to Stelma, Incorporated, Stamford, Conn., a corporation of Connecticut Filed Aug. 24, 1959, Ser. No. 835,736

7 Claims. (Cl. 178—69)

This invention relates to telegraph test sets and more particularly to test sets for providing performance indication of neutral or polar telegraph equipment by selective generation of test signals.

The principal purpose of the invention is to provide telegraph test equipment to supply any of a plurality of desired test signals.

Another purpose of the invention is to provide telegraph test equipment which may be operated in any of a predetermined number of modes of operation.

A further object of the invention is to provide telegraph test equipment for selective generation of test messages, a single character, a plurality of characters alternately repeated, or a square wave.

Further objects, features, and advantages of the invention will appear from the following description with reference to the accompanying drawings.

Telegraphy employs a number of different codes for transmission of telegraph signals. The present invention will be described with reference to one of these codes, the Baudot code. The Baudot code employs seven signals to represent each transmitted character symbol, the first signal being a space or no signal, the next five signals being information bits comprising either a mark-signal or no-signal, the last signal being a stop-mark, to which all equipment is set when not transmitting or receiving. Other codes employ different numbers of bits. However, the system of the invention may be readily applied to handle characters of any telegraphy code commonly in use, by including stages necessary to operate on the arrangements of bits comprised in the desired code.

Figure 1:
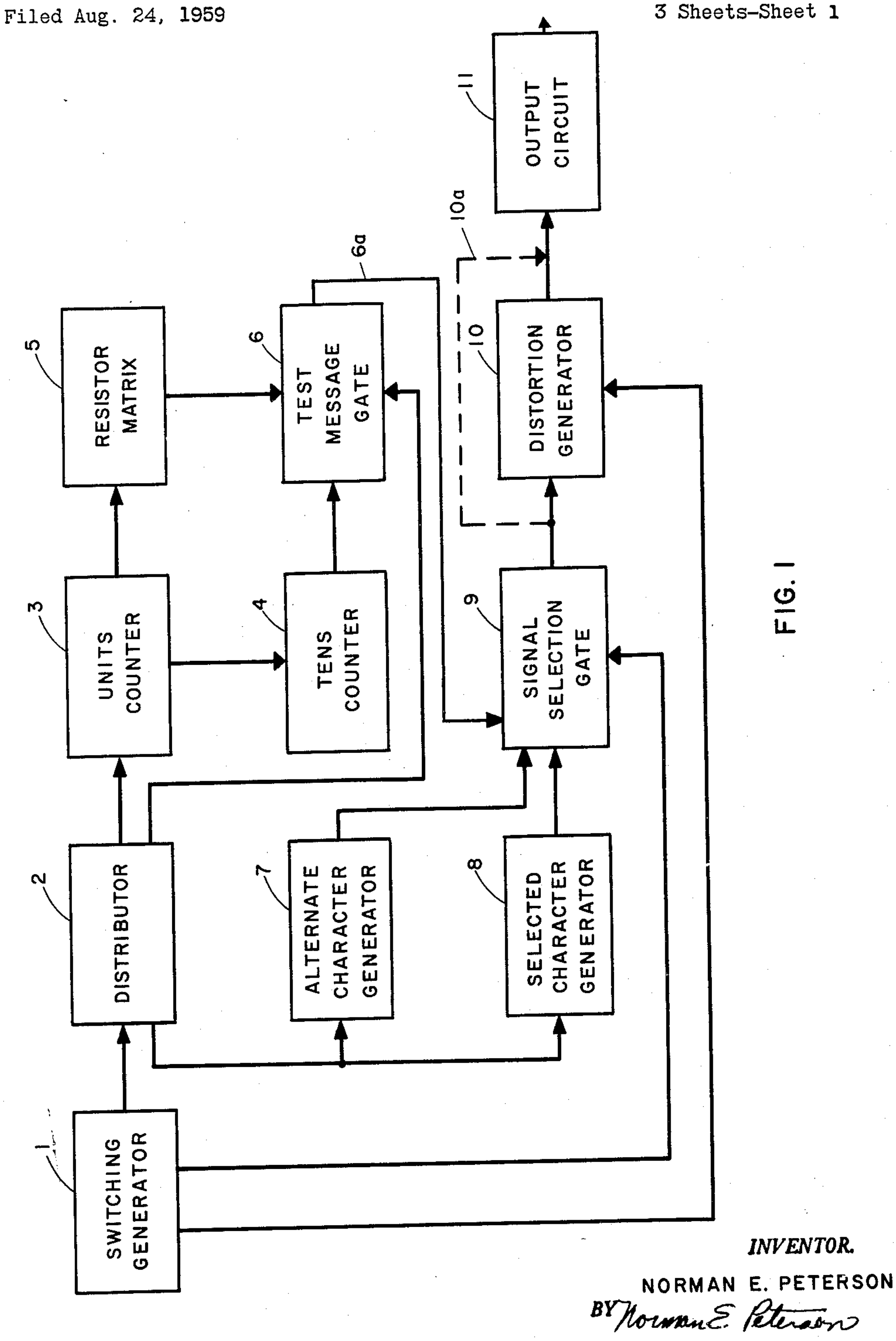
FIG. 1 shows a block diagram of a system embodiment of the invention.
Figure 2:
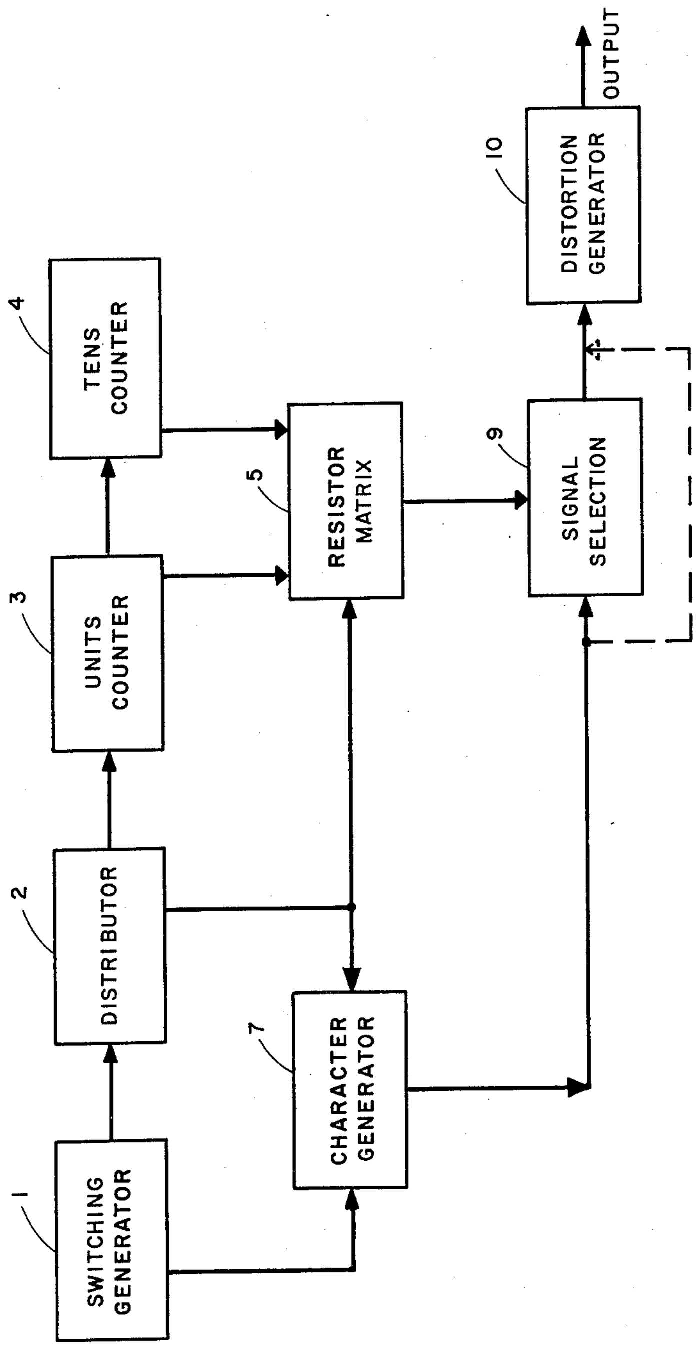
FIG. 2 shows a block diagram of a second embodiment of the invention.

Referring to FIG. 1, resistor matrix 5 serves as a memory for information bits. It is preferred to use a resistor matrix, to obtain the greater accuracy and reliability thereof. However, diode matrixes or other signal memories of the prior art may alternatively be used. A matrix of this general type is set forth in Digital Computer Components and Circuits by R. K. Richards, published 1957 by Van Nostrand Company, Inc., on pages 55–60. Each reference point in the matrix is uniquely determined by states of units counter 3 and distributor 2. For test message generation, as units counter 3 scans matrix 5 in sequence, test message gate 6 produces a mark or space signal corresponding respectively to the presence or absence of a resistor at the specific matrix position being scanned at that instant. Switching generator 1 serves as the master clock for the system. Distributor 2 comprises means, such as magnetron beam-switching tubes or other suitable switching means, for generating stop-start timing signals. Distributor 2 receives triggering signals from switching generator 1 and provides baud gate signals to test message gate 6, as well as counter-stepping pulses at the end of each character, to units counter 3. Tens counter 4 applies a gating signal to test message gate 6 to select a desired group of characters stored in matrix 5. After units counter 3 scans the characters in the selected group, tens counter 4 gates the next consecutive group stored in matrix 5. The character lines of matrix 5 are energized by units counter 3. The existence or non-existence of energizing voltage on a particular baud wire in matrix 5 constitutes a space or mark gate, which is applied to the test message gate circuit 6. Test message gate circuit 6 receives baud, character, and group information from the units and tens counters, and mark and space information from matrix 5. Output of test message gate circuit 6 is the series of marks and spaces that comprise the test message. Distortion generator 10 receives the test message through output lead *6a* and either transmits it distortionless directly to the output circuit by lead *10a*, or introduces controlled bias, i.e. amplitude distortion, or end-distortion, i.e. phase distortion, into the signal before transfer through the output circuit 11 to the test loop. The distortion generator may be of any well-known type which may be either manually or automatically set to generate the desired distortion in the output signals. Bias distortion is obtained simply by attenuating the output level of the coded signals, while end disortion is obtained by delaying the output signals in the manner set forth on pages 483–486 in the reference text Telegraphy by J. W. Freebody, published 1958 by Pitman Press, Great Britain, which describes one test arrangement for introducing distortion into telegraph test signals for measuring maximum amount of distortion permissible before receipt of an invalid coded character. The embodiment of the invention shown in FIG. 2 will be understood from the above description, similarly numbered elements being utilized in ways analogous to those of FIG. 1.

For alternate character generation, gating binary elements in alternate character generator 7 are activated simultaneously by distributor 2. The state of the binary is changed at the start of each character. The functions of switching generator 1, distortion generator 10, and output circuit 11 are the same for alternate character generation as for test message generation described hereinabove. Alternate character generator 7 receives pulses from distributor 2 and produces a series of marks and spaces comprising the alternately repeated characters, which are then fed to distortion generator 10, output 11, and out to the test loop as before.

Selected character generation is analogous to alternate character generation. Selected character generator 8 may include character-setting means such as five manually variable gating switches corresponding to bits of a Baudot code character. These may be set to be programmed for and respond to pulses corresponding to the five intelligence positions of any selected character. Thus, distributor 2 feeds baud pulses to the five gating switches of selected character generator 8, which then puts out the selected character continuously through distortion generator 10 to output circuit 11 and the test loop.

Figure 3:
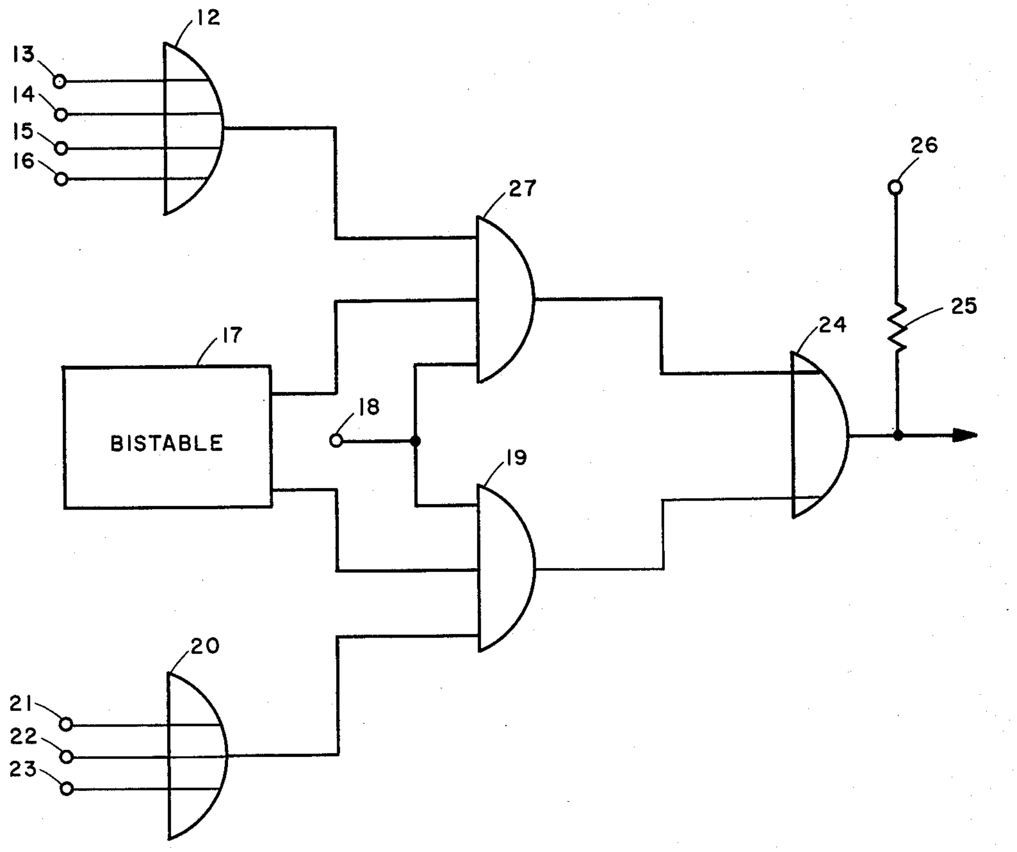
FIG. 3 shows an alternate character generator circuit corresponding to block 7 of the system shown in FIG. 1.

Details of a possible alternate character generator 7 will be described in somewhat greater detail. However, it will be understood that the inventive concept resides in the systems relationship of subordinate elements, and not necessarily in elements such as the alternate character generator, which in itself is not novel. Referring to FIG. 3, signals from distributor 2 of FIG. 1, turn on gates 12 and 20 respectively, during the presence of baud signals 13, 14, and 15, stop signal 16; and baud signals 21 and 22, and stop signal 23. The resulting signals are AND-gated in AND-circuits 27 and 19 respectively with the output of bistable 17, which changes at the start of each character selectively determined at character selector terminal 18. The entire alternate character generator may be disabled by the application of a negative voltage at the common connection 18 to AND-circuits 27 and 19.

As has been stated, alternate character generator 7, as described, like selected character generator 8, is not in itself novel. However, distortion generator 10 may employ means analogous to those of the system of the invention, for application of desired distortion to a selected test message. Referring to FIG. 1, for employment of the system of the invention in distortion generator 10, switching generator 1, distributor 2, units counter 3, and alternate character generator 7 or signal selection gate 9, may be individually modified to serve respectively as an end-distortion generator, a bias generator, a timing-delay binary, and a variable pulse-length circuit.

While particular embodiments of the invention have been described, it will be understood that application or utilization of the present invention may be varied or modified within the scope of the appended claim.

I claim:

1. Telegraph test apparatus for performing a thorough analysis of teleprinter receiving devices in the message loop comprising, a clock pulse source, a storage memory matrix, first counter means under control of said clock pulse source for sequentially energizing each row of said matrix, second counter means connected to said clock pulse source, output means, a test message gating means connected between said matrix and said output means and responsive to said second counter means for passing selected signals to said output means for introduction into the message loop, said output means including distortion means for introducing a controlled amount of distortion into said selected signals.

2. A testing system as in claim 1, in which the matrix consists of an electrical data matrix having a plurality of rows or character lines of data, each row being respectively coded to a selected character, and in which the ring counter distributor is controlled by the first counting means to sense each row of data in sequence and to convert each row of coded data into an operating code signal suitable to operate the teletypewriters in the loop.

3. A testing system, as in claim 1, in which the data storing means consists of a resistor matrix in which resistors are disposed to be selectively electrically connected or absent at cross-over points between a series of horizontal row conductor lines and a series of vertical column conductor lines, and in which the system further includes means for sequentially activating the horizontal row conductor lines to develop corresponding binary voltage conditions on the respective vertical conductor lines; electronic gates connected to be energized according to the binary conditions on the respective vertical conductor lines; and the cooperation between said ring counter distributor and the data storage matrix being effected by the counter selectively controlling said electronic gates according to their energized conditions, in order thereby to cause the gates to transmit the storage data as Baudot coded operating signals to the telegraph load loop.

4. Telegraph test apparatus for performing a thorough analysis of teleprinter receiving devices in the message loop comprising, a clock pulse source, a storage memory matrix, first counter means under control of said clock pulse source for sequentially energizing each row of said matrix, second counter means connected to said clock pulse source, output means, a test message gating means connected between said matrix and said output means and responsive to said second counter means for passing selected signals to said output means for introduction into the message loop, said output means including distortion means for introducing a controlled amount of distortion into said selected signals, alternate character generating means for alternately producing one and the other of a group of at least two coded characters, a signal selection gate connected between said alternate character generating means and said output means, selected character generating means for selecting the test signals from either said matrix or said alternate character generating means under control of said clock pulse source.

5. Telegraph test apparatus for performing a thorough analysis of teleprinter receiving devices in the message loop comprising, a clock pulse source, a storage memory matrix, first counter means under control of said clock pulse source for sequentially energizing each row of said matrix, second counter means connected to said clock pulse source, output means, a test message gating means connected between said matrix and said output means and responsive to said second counter means for passing selected signals to said output means for introduction into the message loop, said output means including distortion means for introducing a controlled amount of distortion into said selected signals, said clock pulse source including a ring counter distributer for grouping the clock pulse output signals into baud signals suitable for telegraphy transmission.

6. Telegraph test apparatus for performing a thorough analysis of teleprinter receiving devices in the message loop comprising, a clock pulse source, a storage memory matrix, first counter means under control of said clock pulse source for sequentially energizing each row of said matrix, second counter means connected to said clock pulse source, output means, a test message gating means connected between said matrix and said output means and responsive to said second counter means for passing selected signals to said output means for introduction into the message loop, said output means including distortion means for introducing a controlled amount of distortion into said selected signals, said clock pulse source comprising an oscillator to serve as a pulse timing generator; a ring counter time-controlled by the oscillator and operative to set up a seven-element Baudot telegraph code, including start, stop, and five intermediate pulse elements; and means responsive to the stop pulse of the counter for stopping and restarting the oscillator for a subsequent operating cycle of the ring counter.

7. A pulse code system as in claim 6, further including, storage memory means comprising a plurality of preset data programs for controlling an external apparatus; means for manually selecting a desired program; and means for electrically combining the storage memory means and the ring counter to convert the program data into Baudot code signals.

References Cited in the file of this patent

UNITED STATES PATENTS

| | | |
|---|---|---|
| 2,553,556 | Dunn et al. | May 23, 1951 |
| 2,689,343 | MacKay | Sept. 14, 1954 |
| 2,832,071 | Hendricks | Apr. 27, 1958 |
| 2,886,797 | Gardberg | May 12, 1959 |
| 2,953,642 | Zahner | Sept. 20, 1960 |
| 2,961,488 | Cameron et al. | Nov. 22, 1960 |

FOREIGN PATENTS

| | | |
|---|---|---|
| 1,095,316 | France | Dec. 22, 1954 |